United States Patent
Tsuchiya (10) Patent No.: US 12,134,328 B2
(45) Date of Patent: Nov. 5, 2024

(54) CHARGING APPARATUS

(71) Applicant: TOYOTA JIDOSHA KABUSHIKI KAISHA, Aichi-ken (JP)

(72) Inventor: Yoshiyuki Tsuchiya, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 503 days.

(21) Appl. No.: 17/542,502

(22) Filed: Dec. 6, 2021

(65) Prior Publication Data
US 2022/0250489 A1   Aug. 11, 2022

(30) Foreign Application Priority Data
Feb. 10, 2021   (JP) .................................. 2021-019563

(51) Int. Cl.
| | |
|---|---|
| *B60L 53/16* | (2019.01) |
| *B60L 53/35* | (2019.01) |
| B60L 53/20 | (2019.01) |
| B60L 53/31 | (2019.01) |
| B60L 53/66 | (2019.01) |

(52) U.S. Cl.
CPC .............. *B60L 53/16* (2019.02); *B60L 53/35* (2019.02); *B60L 53/20* (2019.02); *B60L 53/31* (2019.02); *B60L 53/66* (2019.02); *Y02T 90/12* (2013.01)

(58) Field of Classification Search
CPC .......... B60L 53/16; B60L 53/20; B60L 53/66; B60L 2240/80; B60L 53/31; B60L 53/60; B60L 53/35; Y02T 10/70; Y02T 10/7072; Y02T 90/12; E01F 13/123

USPC ........................................................... 320/109
See application file for complete search history.

(56) References Cited

U.S. PATENT DOCUMENTS

| | | | |
|---|---|---|---|
| 5,499,887 A | 3/1996 | Verra | |
| 9,446,676 B2 * | 9/2016 | Reinschke | .............. B60L 53/14 |
| 2013/0113425 A1 * | 5/2013 | Kauffmann | .............. B60L 53/31 |
| | | | 320/109 |
| 2020/0324661 A1 * | 10/2020 | Freeling-Wilkinson | ..................... |
| | | | B60L 53/31 |
| 2021/0268922 A1 | 9/2021 | Oyaizu | |
| 2022/0305931 A1 * | 9/2022 | Kinomura | ............... B60L 53/31 |

FOREIGN PATENT DOCUMENTS

| | | |
|---|---|---|
| CN | 205174285 U | 4/2016 |
| CN | 209274401 U | 8/2019 |
| CN | 210979613 U | 7/2020 |

(Continued)

*Primary Examiner* — Drew A Dunn
*Assistant Examiner* — Atm M Rahman
(74) *Attorney, Agent, or Firm* — HAUPTMAN HAM, LLP (57) ABSTRACT

A charging apparatus installed at a bottom of a hollow in a ground and configured to charge a power storage device mounted on a vehicle includes a movable unit, an ascending and descending device, and a control device. The movable unit includes a connection device connectable to the power storage device. The ascending and descending device causes the movable unit to ascend or descend between a first state and a second state. The control device controls the ascending and descending device to set the movable unit into the first state when a current time is within a first time frame. The control device controls the ascending and descending device to set the movable unit into the second state when the current time is within a second time frame different from the first time frame.

2 Claims, 5 Drawing Sheets

(56) References Cited

FOREIGN PATENT DOCUMENTS

| | | |
|---|---|---|
| EP | 0694433 A1 | 1/1996 |
| JP | 2011109807 A | 6/2011 |
| JP | 5475407 B2 | 4/2014 |
| WO | 2019/215423 A1 | 11/2019 |
| WO | 2020/003498 A1 | 1/2020 |

* cited by examiner

CHARGING APPARATUS

CROSS-REFERENCE TO RELATED APPLICATION

This application claims priority to Japanese Patent Application No. 2021-019563 filed on Feb. 10, 2021, incorporated herein by reference in its entirety.

BACKGROUND

1. Technical Field

The present disclosure relates to a charging apparatus.

2. Description of Related Art

Charging apparatuses for charging power storage devices mounted on vehicles or the like are installed at parking lots or sidewalks outside the vehicles or the like, but may hinder pedestrians from walking or vehicles from traveling because the charging apparatuses occupy installation spaces. Therefore, there is known a technology in which the charging apparatus is movable and housed, for example, under the ground.

For example, Japanese Unexamined Patent Application Publication No. 2011-109807 (JP 2011-109807 A) discloses a charging pole ascendable or descendable to stand on the ground or to be housed under the ground.

SUMMARY

When the movable charging apparatus ascendable and descendable as described above is kept standing on the ground unnecessarily, the charging apparatus is exposed above the ground, and may spoil the sight. When the charging apparatus is kept housed under the ground, there is a need to wait until the charging apparatus comes to stand on the ground when the charging apparatus is used at a high frequency. Therefore, the convenience of the charging apparatus may be spoiled.

The present disclosure provides a charging apparatus that does not spoil the sight and convenience.

A charging apparatus according to an aspect of the present disclosure is installed at a bottom of a hollow in a ground and configured to charge a power storage device mounted on a vehicle. The charging apparatus includes a movable unit, an ascending and descending device, and a control device. The movable unit includes a connection device configured to be able to connect to the power storage device. The ascending and descending device is configured to cause the movable unit to ascend or descend between a first state and a second state. The first state is a state in which the movable unit is housed under the ground. The second state is a state in which the movable unit is exposed above the ground and the power storage device and the connection device are connectable together. The control device is configured to control the ascending and descending device to set the movable unit into the first state when a current time is within a first time frame, and control the ascending and descending device to set the movable unit into the second state when the current time is within a second time frame different from the first time frame.

In the charging apparatus according to the aspect of the present disclosure, when the current time is within the first time frame, the movable unit is set into the first state in which the movable unit is housed under the ground. Therefore, it is possible to suppress the spoilage of the sight due to the exposure of the movable unit within the first time frame. When the current time is within the second time frame, the movable unit is set into the second state in which the movable unit is exposed above the ground. Therefore, a user can charge the vehicle without waiting for the ascent of the movable unit within the second time frame. Thus, it is possible to suppress the spoilage of the convenience of the charging apparatus.

In the charging apparatus according to the aspect of the present disclosure, the first time frame may include a predetermined time frame during daytime. In the charging apparatus according to the aspect of the present disclosure, the movable unit is set into the first state in which the movable unit is housed under the ground within a bright time frame during the daytime in which the movable unit exposed above the ground is conspicuous. Therefore, it is possible to suppress the spoilage of the sight due to the exposure of the movable unit within the first time frame.

In the charging apparatus according to the aspect of the present disclosure, the control device may be configured to set the first time frame to include a time frame in which a sunlight level at the charging apparatus is higher than a threshold.

In the charging apparatus according to the aspect of the present disclosure, the movable unit is set into the first state in which the movable unit is housed under the ground within the time frame in which the sunlight level is higher than the threshold and the movable unit exposed above the ground is conspicuous. Therefore, it is possible to suppress the spoilage of the sight due to the exposure of the movable unit within the first time frame.

In the charging apparatus according to the aspect of the present disclosure, the control device may be configured to set the second time frame to include a time frame in which a frequency of use of the charging apparatus is higher than a threshold.

In the charging apparatus according to the aspect of the present disclosure, the movable unit is set into the second state in which the movable unit is exposed above the ground within the second time frame in which the frequency of use is high. Therefore, the user can charge the vehicle without waiting for the ascent of the movable unit within the second time frame. Thus, it is possible to suppress the spoilage of the convenience of the charging apparatus.

According to the present disclosure, it is possible to provide the charging apparatus that does not spoil the sight and convenience.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure is described below in detail with reference to the drawings. In the drawings, the same or corresponding parts are represented by the same reference symbols to omit redundant description.

Figure 1:
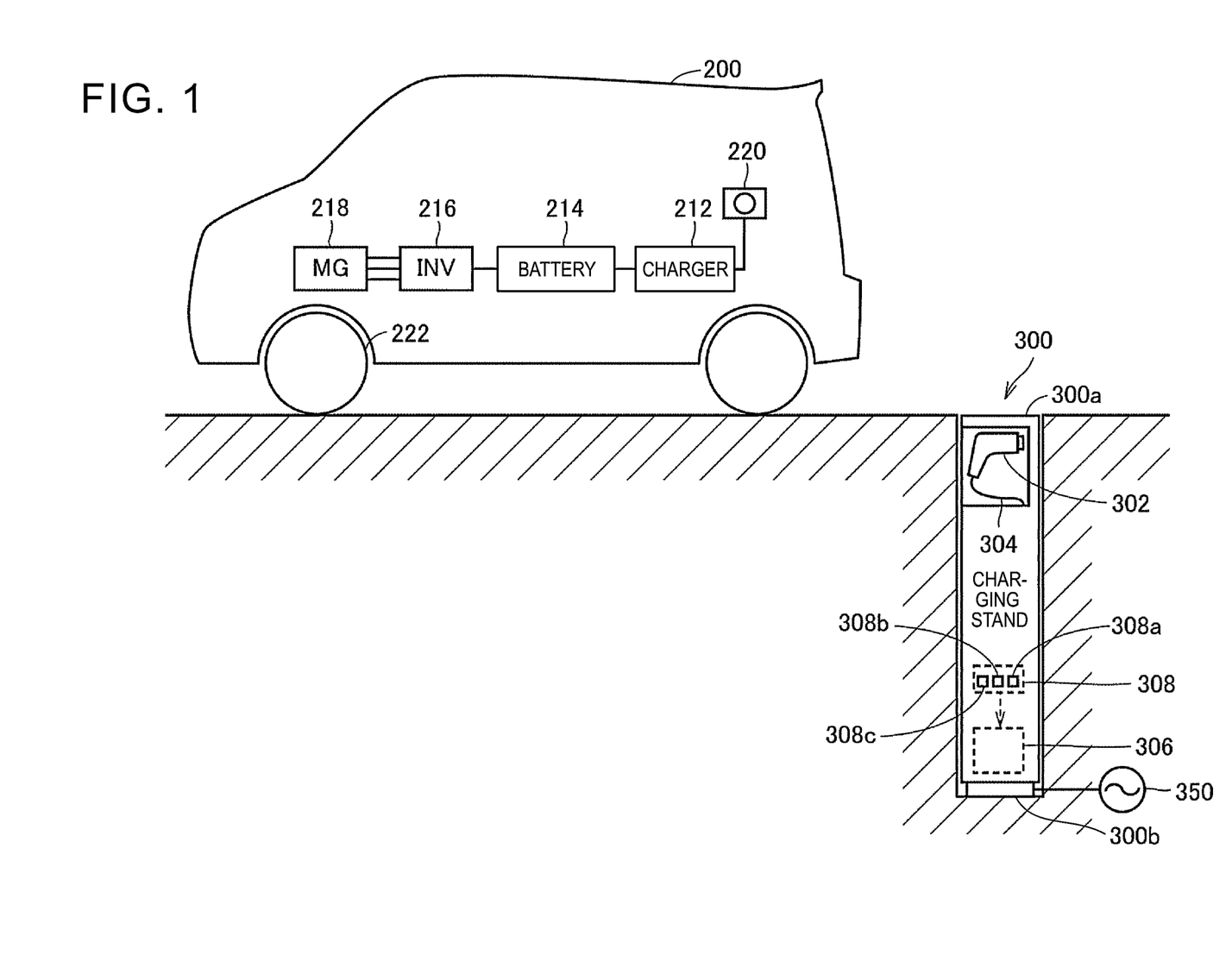
FIG. 1 is a diagram illustrating an example of the structures of a motor vehicle and a charging stand whose movable unit is housed under the ground.
Figure 2:
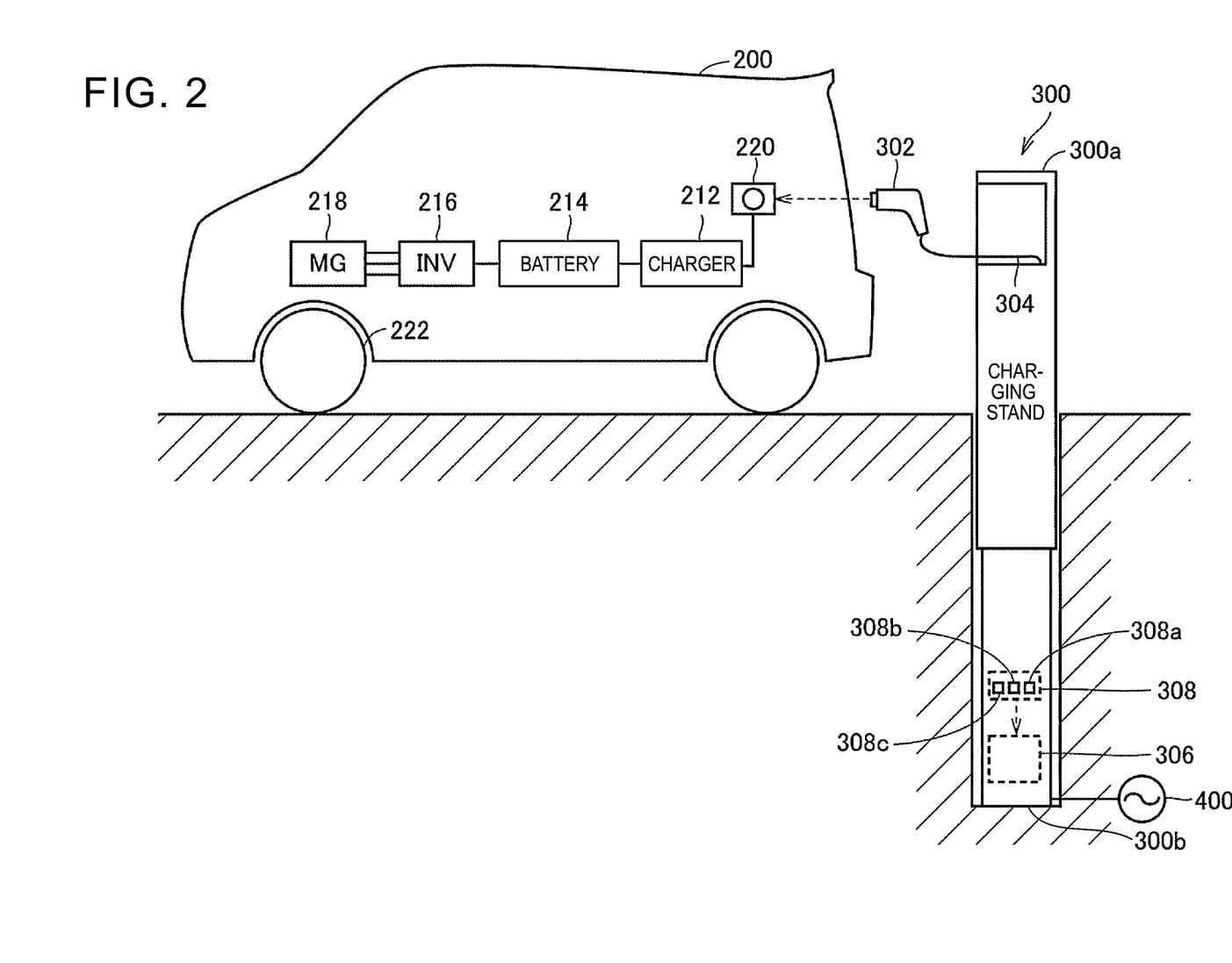
FIG. 2 is a diagram illustrating an example of the structures of the motor vehicle and the charging stand whose movable unit is exposed above the ground.

For example, description is given of the structure of a charging stand 300 serving as a charging apparatus according to the embodiment of the present disclosure. FIG. 1 is a diagram illustrating an example of the structures of a motor vehicle 200 and the charging stand 300 whose movable unit 300a (described later) is housed under the ground. FIG. 2 is a diagram illustrating an example of the structures of the motor vehicle 200 and the charging stand 300 whose movable unit 300a is exposed above the ground.

As illustrated in FIG. 1 and FIG. 2, the charging stand 300 is ascendable and descendable between a first state (see FIG. 1) in which the upper end is positioned substantially flush with the ground and the movable unit 300a is housed under the ground, and a second state (see FIG. 2) in which the upper end ascends to a predetermined position above the ground and the movable unit 300a is exposed.

For example, the charging stand 300 includes a cylindrical casing, and is installed at the bottom of a hollow in the ground. The hollow in the ground has a predetermined clearance from the outer peripheral surface of the casing of the charging stand 300, and the depth of the hollow is approximately equal to the vertical length of the charging stand 300 in the first state.

The charging stand 300 includes the movable unit 300a and a stationary unit 300b. A housing space that can house a connector 302 is formed at the top of the movable unit 300a. The connector 302 is connected to one end of a cable 304 whose other end is connected to a power supply 350. The power supply 350 is an alternating current (AC) power supply such as a commercial power supply. For example, the cable 304 includes a formative extensible and contractible portion including a curl portion, or a structural extensible and contractible portion including a take-up structure. When the connector 302 is carried, the cable 304 is extensible to an inlet 220 of the motor vehicle 200 parked in a parking space.

The stationary unit 300b is fixed to the bottom of the hollow in the ground. The stationary unit 300b may be fixed anywhere in the hollow in the ground, and need not particularly be fixed to the bottom of the hollow.

The stationary unit 300b includes an ascending and descending device 306 configured to cause the movable unit 300a to ascend or descend in a vertical direction, and a control device 308 configured to control operations of the ascending and descending device 306.

For example, the ascending and descending device 306 may include a rack and pinion mechanism configured to cause the movable unit 300a to ascend or descend by rotating, with an electric actuator, a pinion gear meshing with a rack gear fixed to the movable unit 300a, a mechanism using a hydraulic cylinder in which a rod connected to a piston is fixed to the movable unit 300a, and configured to cause the movable unit 300a to ascend or descend by increasing or reducing a hydraulic pressure to be supplied to a cylinder body fixed to the stationary unit 300b, or a mechanism configured to cause the movable unit 300a to ascend or descend by generating a repulsive force with a magnetic force between the movable unit 300a and the stationary unit 300b.

The ascending and descending device 306 is configured such that the movable unit 300a does not descend below a position corresponding to the first state and does not ascend above a position corresponding to the second state by using, for example, stopper mechanisms.

The control device 308 includes a central processing unit (CPU) 308a, a memory 308b including a read only memory (ROM) and a random access memory (RAM), and a communicator 308c communicable with external devices. The control device 308 controls electric devices (for example, the ascending and descending device 306) provided in the charging stand 300 based on information stored in the memory 308b, information received via the communicator 308c, or information acquired from sensors (not illustrated). The electric devices may be controlled not only by a structure in which the CPU 308a executes software processes, but also by a structure constituted by dedicated hardware (electronic circuit).

The communicator 308c can communicate various types of information with devices outside the charging stand 300. For example, the communicator 308c may communicate with a management server (not illustrated), with a mobile terminal (not illustrated) of a user who desires charging at the charging stand 300, or with other charging stands 300.

For example, the communicator 308c may communicate with the management server or other charging stands 300 through wired communication. Alternatively, the communicator 308c may communicate with the management server, the mobile terminal, or other charging stands 300 through, for example, wireless communication.

For example, when an execution condition for ascending control is satisfied, the control device 308 executes the ascending control on the ascending and descending device 306 to switch the charging stand 300 from the first state to the second state. For example, the execution condition for the ascending control includes a condition that the charging stand 300 is in the first state, and a condition that an ascending request is made for the charging stand 300. For example, the ascending request may be received from the management server, the mobile terminal, or any other charging stand 300.

For example, when an execution condition for descending control is satisfied, the control device 308 executes the descending control on the ascending and descending device 306 to switch the charging stand 300 from the second state to the first state. For example, the execution condition for the descending control includes a condition that the charging stand 300 is in the second state, and a condition that a descending request is made for the charging stand 300. For example, the descending request may be received from the management server, the mobile terminal, or any other charging stand 300.

FIG. 1 and FIG. 2 further illustrate an example of the structure of the motor vehicle 200 parked in a parking space where charging is available at the charging stand 300. As illustrated in FIG. 1 and FIG. 2, the motor vehicle 200 is a vehicle including a power storage device, such as a plug-in hybrid vehicle or an electric vehicle. The motor vehicle 200 only needs to receive electric power supplied from the charging stand 300, and is not particularly limited to the vehicles exemplified above. For example, the motor vehicle 200 may be a vehicle including a power storage device for external power feed.

The motor vehicle 200 includes a charger 212, a battery 214, an inverter 216, a motor generator 218, and the inlet 220.

When AC power is supplied from the inlet 220, the charger 212 converts the supplied AC power into direct current (DC) power, and supplies the DC power to the battery 214. The battery 214 is charged through the operation of the charger 212. For example, the charger 212 is controlled based on a control signal from an electronic control unit (ECU) (not illustrated) of the motor vehicle 200.

For example, the battery 214 is a rechargeable power storage element typified by a secondary battery such as a nickel-metal hydride battery or a lithium ion battery including a liquid or solid electrolyte. Alternatively, the battery 214 may be a power storage device that can store electric power. For example, a large-capacity capacitor may be used in place of the battery 214.

For example, the inverter 216 converts DC power of the battery 214 into AC power, and supplies the AC power to the motor generator 218. For example, the inverter 216 converts AC power from the motor generator 218 (regenerative power) into DC power, and supplies the DC power to the battery 214 to charge the battery 214.

The motor generator 218 gives a rotational force to driving wheels 222 by receiving electric power supplied from the inverter 216. The driving wheels 222 are rotated by the rotational force given from the motor generator 218 to cause the motor vehicle 200 to travel.

The inlet 220 is provided together with a cover (not illustrated) such as a lid at a part of the exterior of the motor vehicle 200. The inlet 220 is a power receiver configured to receive charging power supplied from an external charging apparatus (for example, the charging stand 300). The inlet 220 is shaped such that the connector 302 of the charging stand 300 is attachable to the inlet 220. Both the inlet 220 and the connector 302 include contacts. When the connector 302 is attached to the inlet 220, the contacts are brought into contact with each other, and the inlet 220 and the connector 302 are electrically connected together. At this time, the battery 214 of the motor vehicle 200 is chargeable with electric power supplied from the charging stand 300.

Figure 3:
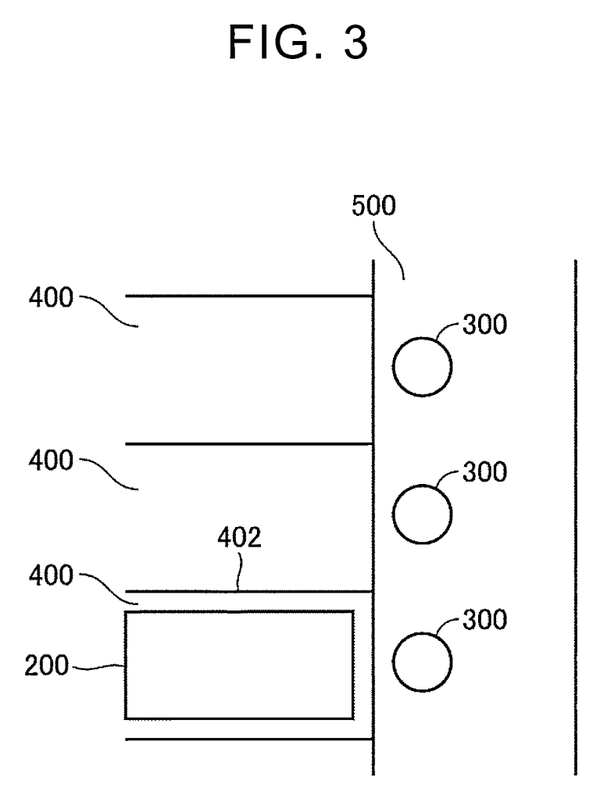
FIG. 3 is a diagram illustrating an example of a layout of charging stands and parking spaces.

The charging stands 300 may be installed on a sidewalk adjacent to a plurality of parking spaces in a parking lot, or on a sidewalk adjacent to a plurality of parking spaces set along a road. FIG. 3 is a diagram illustrating an example of a layout of the charging stands 300 and parking spaces 400. As illustrated in FIG. 3, when the parking spaces 400 are set side by side across partition lines 402 at a plurality of positions in a parking lot, the charging stands 300 are installed at positions adjacent to the respective parking spaces 400. For example, FIG. 3 illustrates a structure in which a sidewalk 500 is provided at one longitudinal end of each parking space 400 (right side on the drawing sheet of FIG. 3). In this case, the charging stands 300 are installed along the sidewalk 500. When the motor vehicle 200 is parked in any one of the parking spaces 400 and the charging stand 300 is in the second state, the user carries the connector 302 from the charging stand 300 and connects the connector 302 to the inlet 220 of the motor vehicle 200.

Figure 4:
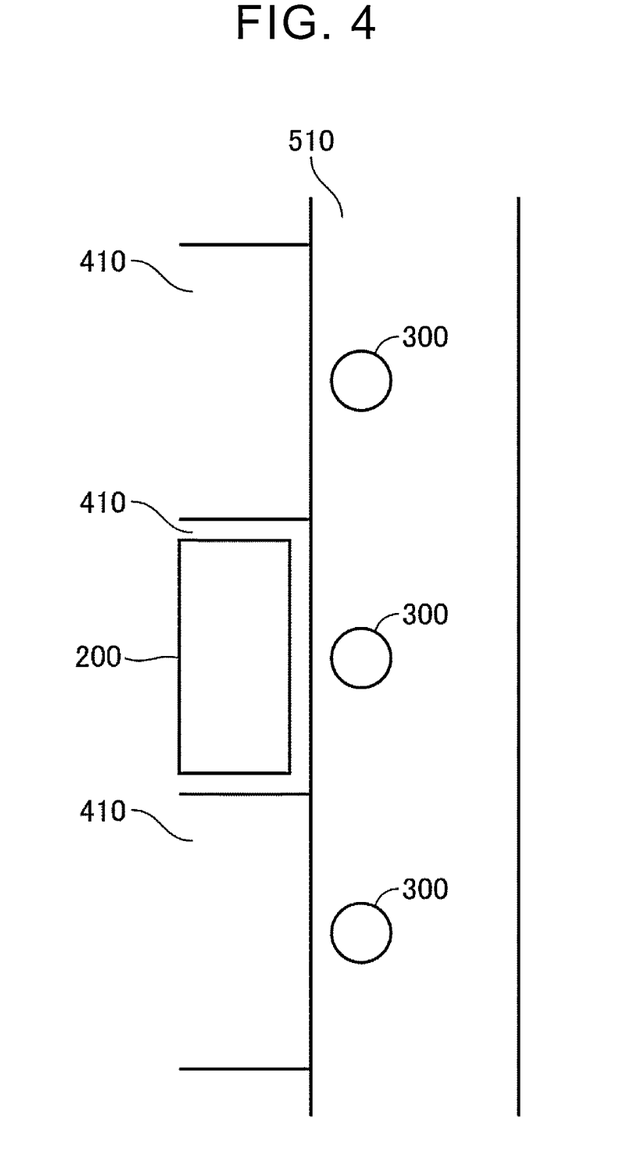
FIG. 4 is a diagram illustrating another example of the layout of the charging stands and the parking spaces.

FIG. 4 is a diagram illustrating another example of the layout of the charging stands 300 and parking spaces 410. As illustrated in FIG. 4, when the parking spaces 410 are set end to end across partition lines 412 at a plurality of positions along a road, the charging stands 300 are installed at positions adjacent to the respective parking spaces 410. For example, FIG. 4 illustrates a structure in which the parking spaces 410 are set along a sidewalk 510. In this case, the charging stands 300 are installed along the sidewalk 510. When the motor vehicle 200 is parked in any one of the parking spaces 410 and the charging stand 300 is in the second state, the user carries the connector 302 from the nearest charging stand 300 and connects the connector 302 to the inlet 220 of the motor vehicle 200.

When the charging stand 300 is in the first state, the user transmits an ascending request to the charging stand 300 by using the mobile terminal or via the management server. In response to the ascending request, the control device 308 of the charging stand 300 controls the ascending and descending device 306 to set the second state.

When the movable charging stand 300 ascendable and descendable as described above is kept standing on the ground unnecessarily, the movable unit 300a of the charging stand 300 is exposed above the ground, and may spoil the sight. When the movable unit 300a is kept housed under the ground, the user needs to wait until the charging stand 300 comes to stand on the ground when the charging stand 300 is used at a high frequency. Therefore, the convenience of the charging stand 300 may be spoiled.

In this embodiment, when the current time is within a first time frame, the control device 308 of the charging stand 300 controls the ascending and descending device 306 to set the charging stand 300 into the first state. When the current time is within a second time frame different from the first time frame, the control device 308 controls the ascending and descending device 306 to set the charging stand 300 into the second state. In this embodiment, the first time frame includes a predetermined time frame during daytime.

Through the operations described above, the movable unit 300a is in the first state in which the movable unit is housed under the ground within a bright time frame during the daytime in which the movable unit exposed above the ground is conspicuous. Therefore, it is possible to suppress the spoilage of the sight due to the exposure of the movable unit within the first time frame.

Figure 5:
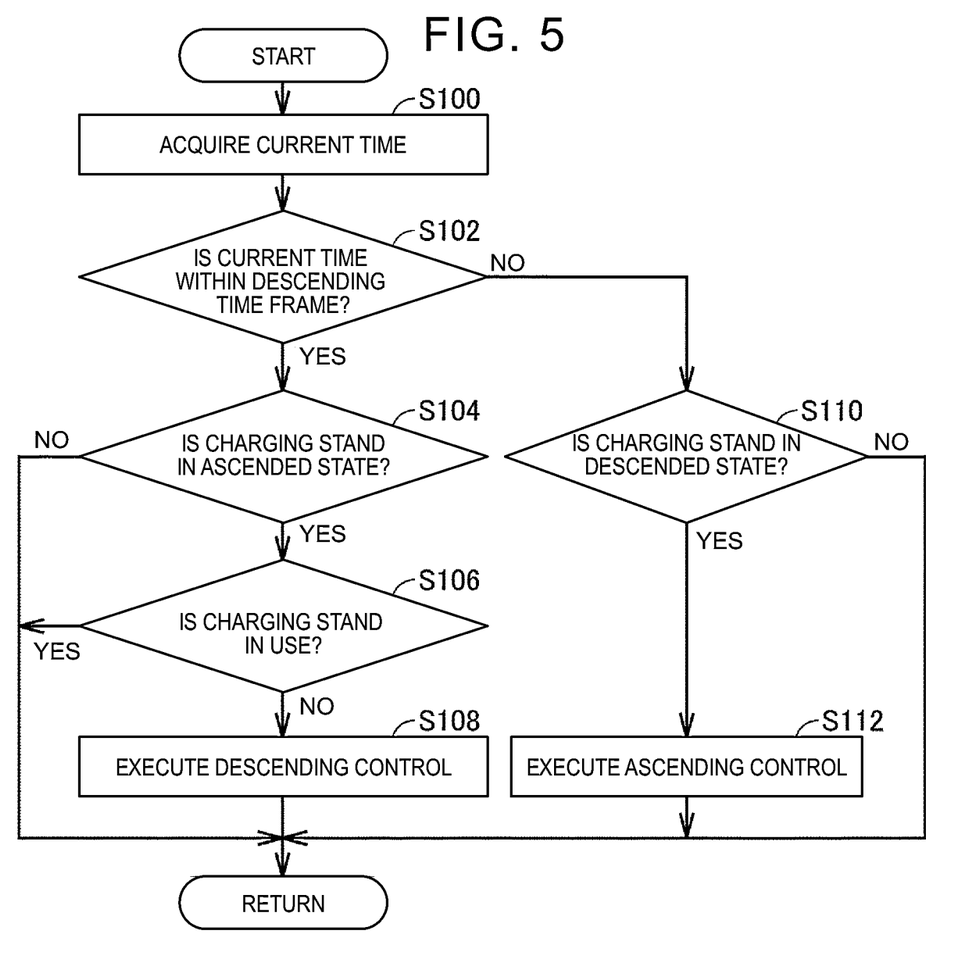
FIG. 5 is a flowchart illustrating an example of processes to be executed by a control device of the charging stand.

An example of control processes to be executed by the control device 308 is described below with reference to FIG. 5. FIG. 5 is a flowchart illustrating the example of the processes to be executed by the control device 308. The series of processes illustrated in this flowchart is repeated by the control device 308 in every predetermined control period.

In Step (hereinafter represented by "S") 100, the control device 308 acquires a current time. For example, the control device 308 may acquire the current time by using an internal timer circuit or based on time information received from the management server via the communicator 308c.

In S102, the control device 308 determines whether the current time is within a descending time frame. In this embodiment, the descending time frame corresponds to the first time frame, and a time frame other than the descending time frame in a day corresponds to the second time frame. For example, the start of the descending time frame is set to a predetermined time t(0) in a day. The end of the descending time frame is set to a predetermined time t(1) in a day. Information related to the start and the end of the descending time frame is prestored in the memory 308b of the control device 308. For example, the descending time frame includes a predetermined time frame during daytime. For example, the predetermined time frame during the daytime includes a time frame in which the surroundings of the charging stand 300 are bright to a degree that, when the movable unit 300a of the charging stand 300 is exposed, the exposed part is conspicuous to surrounding pedestrians or the like. When determination is made that the current time is within the descending time frame ("YES" in S102), the processes proceed to S104.

In S104, the control device 308 determines whether the charging stand 300 is in an ascended state (that is, the second state). For example, the control device 308 may determine that the charging stand 300 is in the ascended state when an ascent and descent flag is ON. The ascent and descent flag is set to ON when the ascending control is executed, and is set to OFF when the descending control is executed. When determination is made that the charging stand 300 is in the ascended state ("YES" in S104), the processes proceed to S106.

In S106, the control device 308 determines whether the charging stand 300 is in use. The control device 308 determines that the charging stand 300 is in use when the charging stand 300 is supplying electric power, when the connector 302 is not housed in the housing space at the top of the movable unit 300a, or when a predetermined period has not elapsed since the charging stand 300 came into the ascended state (or the ascending control was executed) in response to an ascending request from the user. When determination is made that the charging stand 300 is in use ("YES" in S106), the processes are terminated. When determination is made that the charging stand 300 is not in use ("NO" in S106), the processes proceed to S108.

In S108, the control device 308 executes the descending control. The control device 308 controls the ascending and descending device 306 to cause the movable unit 300a to descend to the position corresponding to the first state. At this time, the control device 308 sets the ascent and descent flag to OFF. When determination is made that the current time is not within the descending time frame ("NO" in S102), the processes proceed to S110.

In S110, the control device 308 determines whether the charging stand 300 is in a descended state (that is, the first state). The control device 308 determines that the charging stand 300 is in the descended state when the ascent and descent flag is OFF. When determination is made that the charging stand 300 is in the descended state ("YES" in S110), the processes proceed to S112.

In S112, the control device 308 executes the ascending control. The control device 308 controls the ascending and descending device 306 to cause the movable unit 300a to ascend to the position corresponding to the second state. At this time, the control device 308 sets the ascent and descent flag to ON. When determination is made that the charging stand 300 is not in the ascended state ("NO" in S104) or that the charging stand 300 is not in the descended state ("NO" in S110), the processes are terminated.

Figure 6:
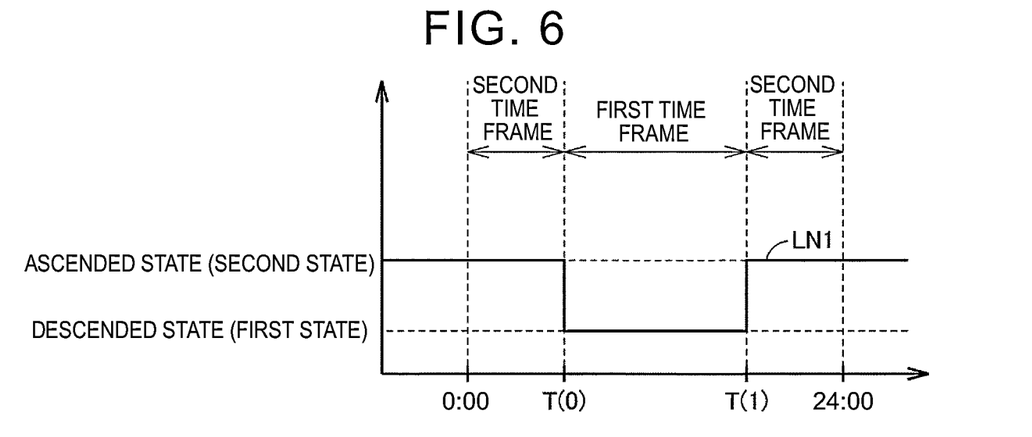
FIG. 6 is a timing chart for describing operations of the control device of the charging stand.

Referring to FIG. 6, description is given of an example of operations of the control device 308 of this embodiment based on the structure and flowchart described above. FIG. 6 is a timing chart for describing the operations of the control device 308 of the charging stand 300. A vertical axis of FIG. 6 represents an ascending or descended state of the charging stand 300. A horizontal axis of FIG. 6 represents time. In FIG. 6, "LN1" represents a change in the ascending or descended state of the charging stand 300. For example, the first time frame is set to a time frame from a time T(0) to a time T(1), and the second time frame is set to a time frame other than the first time frame in a day (that is, a time frame including a time frame from 0:00 to the time T(0) and a time frame from the time T(1) to 24:00).

A current time is acquired (S100). When the acquired current time is, for example, 0:00, the current time is not within the descending time frame ("NO" in S102), and the charging stand 300 is in the second state ("NO" in S110). Therefore, the charging stand 300 is kept in the ascended state.

When the current time reaches the time T(0), the current time is within the descending time frame ("YES" in S102), and the charging stand 300 is in the ascended state ("YES" in S104). Therefore, the descending control is executed (S108) when the charging stand 300 is not in use ("NO" in S106).

The ascending and descending device 306 is controlled to cause the movable unit 300a of the charging stand 300 to descend until the height of the top of the movable unit 300a becomes substantially equal to the height of the ground. Thus, the charging stand 300 is set into the first state.

When the charging stand 300 is set into the first state, the current time is within the descending time frame until the time T(1) ("YES" in S102), and the charging stand 300 is in the first state ("NO" in S104). Therefore, the charging stand 300 is kept in the first state. An ascending request is received within a period from the time T(0) to the time T(1).

When the current time has passed the time T(1), the current time is not within the descending time frame ("NO" in S102), and the charging stand 300 is in the first state ("YES" in S110). Therefore, the ascending control is executed (S112). The ascending and descending device 306 is controlled to cause the movable unit 300a of the charging stand 300 to ascend until the height of the top of the movable unit 300a reaches a predetermined height from the ground. Thus, the charging stand 300 is set into the second state.

In the charging stand 300 serving as the charging apparatus according to this embodiment described above, when the current time is within the first time frame including the predetermined time frame during the daytime, the movable unit 300a is set into the first state in which the movable unit 300a is housed under the ground. Therefore, it is possible to suppress the spoilage of the sight due to the exposure of the movable unit 300a within the first time frame. When the current time is within the second time frame, the movable unit 300a is exposed above the ground. Therefore, the user can charge the motor vehicle without waiting for the ascent of the movable unit 300a within the second time frame. Thus, it is possible to suppress the spoilage of the convenience of the charging apparatus. Accordingly, it is possible to provide a charging apparatus that does not spoil the sight and convenience.

Modified examples are described below. In the embodiment described above, the power supply 350 is the AC power supply, but may be a DC power supply. In this case, the motor vehicle 200 may be, for example, structured such that the charger 212 is omitted.

In the embodiment described above, the second time frame is set to the time frame other than the first time frame in a day. For example, the second time frame may be set to a part of the time frame other than the first time frame. For example, when an ascending request is made within a time frame other than the first time frame and the second time frame, the second state may be kept until a descending request is made subsequently or the first time frame comes. When a descending request is made within the time frame, the first state may be kept until an ascending request is made subsequently or the second time frame comes.

In the embodiment described above, the first time frame includes, for example, the time frame from the time T(0) to the time T(1), but may include, for example, a plurality of time frames.

In the embodiment described above, the second time frame includes, for example, the time frame from 0:00 to the time T(0) and the time frame from the time T(1) to 24:00, but may include one time frame or three or more time frames.

In the embodiment described above, the control device 308 controls the ascending and descending device 306 to perform the set ascending and descending operations within the first time frame and the second time frame. In addition to this control, the control device 308 may request, for example, adjacent charging stands 300 or surrounding charging stands 300 to perform the set ascending and descending operations within the first time frame and the second time frame via the communicator 308c, or may request, for example, each of the first time frames and the second time frames to be set to equal time frames. Through this control, the time frames to perform the ascending and descending operations of the plurality of charging stands 300 can be changed easily. The communication of the request for the ascending and descending operations or the request for setting may be performed via the management server or directly with the surrounding charging stands 300.

The embodiment described above is directed to, for example, the structure in which the connector 302 is housed in the housing space at the top of the movable unit 300a. For example, a socket may be exposed on the side of the top of the movable unit 300a. With this structure, the user can charge the battery 214 mounted on the motor vehicle 200 by connecting the inlet 220 of the motor vehicle 200 to the socket of the charging stand 300 with an outlet cable prepared separately.

In the embodiment described above, the casing of the charging stand 300 has, for example, the cylindrical shape, but only needs to have a shape in which the ascending and descending operations are possible, and the shape is not particularly limited to the cylindrical shape. For example, the casing of the charging stand 300 may have a rectangular parallelepiped shape.

In the embodiment described above, the first time frame includes the predetermined time frame during the daytime. For example, the control device 308 may set the start of the first time frame based on a time of sunrise determined from a month and a day, and set the end of the first time frame based on a time of sunset determined from the month and the day. For example, the control device 308 may set the first time frame by acquiring the month and the day from the management server, or may acquire the first time frame set by the management server based on the month and the day, and set the first time frame as the time frame for the control to set the first state. Alternatively, the control device 308 may set the first time frame to include a time frame in which a sunlight level at the charging stand 300 is higher than a threshold. For example, the control device 308 may use an illuminance sensor (not illustrated) to set the first time frame to include a time frame in which a sunlight level on a previous day is higher than the threshold. The control device 308 may estimate a time frame in which the sunlight level is higher than the threshold based on a month and a day and based on a current position, and set the first time frame to include the estimated time frame. When the sunlight level detected by the illuminance sensor is higher than the threshold, the control device 308 may set, as the first time frame, a time frame corresponding to an elapse of a predetermined period from a time when the sunlight level has exceeded the threshold.

All or part of the modified examples may be combined as appropriate. It should be understood that the embodiment disclosed herein is illustrative but is not limitative in all respects. The scope of the present disclosure is defined by the claims rather than the above description, and is intended to encompass meanings of equivalents to the elements in the claims and all modifications within the scope of the claims.

What is claimed is:

1. A charging apparatus installed at a bottom of a hollow in a ground and configured to charge a power storage device mounted on a vehicle, the charging apparatus comprising:
   a movable unit including a connection device configured to be able to connect to the power storage device;
   an ascending and descending device configured to cause the movable unit to ascend or descend between a first state and a second state, the first state being a state in which the movable unit is housed under the ground, the second state being a state in which the movable unit is exposed above the ground and the power storage device and the connection device are connectable together; and
   a control device configured to
      control the ascending and descending device to set the movable unit into the first state when a current time is within a first time frame,
      control the ascending and descending device to set the movable unit into the second state when the current time is within a second time frame different from the first time frame, and
      set the first time frame to include a time frame in which a sunlight level at the charging apparatus is higher than a threshold.

2. The charging apparatus according to claim 1, wherein the first time frame includes a predetermined time frame during daytime.

* * * * *